(12) United States Patent
Chen et al.

(10) Patent No.: US 10,956,603 B2
(45) Date of Patent: Mar. 23, 2021

(54) PRIVATE DATA AGGREGATION FRAMEWORK FOR UNTRUSTED SERVERS

(71) Applicant: Samsung Electronics Co., Ltd., Suwon-si (KR)

(72) Inventors: Rui Chen, Mountain View, CA (US); Haoran Li, Mountain View, CA (US); Shiva Kasiviswanathan, Mountain View, CA (US); Hongxia Jin, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 304 days.

(21) Appl. No.: 15/282,776

(22) Filed: Sep. 30, 2016

(65) Prior Publication Data

US 2017/0293772 A1    Oct. 12, 2017

Related U.S. Application Data

(60) Provisional application No. 62/319,637, filed on Apr. 7, 2016.

(51) Int. Cl.
*G06F 21/62* (2013.01)
*H04W 12/08* (2009.01)
(Continued)

(52) U.S. Cl.
CPC ........ *G06F 21/6245* (2013.01); *G06F 16/951* (2019.01); *G06F 21/32* (2013.01);
(Continued)

(58) Field of Classification Search
CPC ............ G06F 21/6245; G06F 21/6227; G06F 21/6254
See application file for complete search history.

(56) References Cited

U.S. PATENT DOCUMENTS

| 8,713,090 B2 | 4/2014 | Sadovsky et al. |
| 8,732,091 B1 | 5/2014 | Abhyanker |
(Continued)

FOREIGN PATENT DOCUMENTS

| KR | 10-2015-0132803 | 11/2015 |
| WO | 2015-026386 | 2/2015 |
(Continued)

OTHER PUBLICATIONS

International Search Report from International Application No. PCT/KR2017/003789 dated Jul. 10, 2017.
(Continued)

*Primary Examiner* — Jason K Gee
*Assistant Examiner* — Suman Debnath

(57) ABSTRACT

A first device specifies a privacy specification. The privacy specification includes at least a safe zone and a precision parameter may also be specified. A second device, such as an untrusted server, uses the privacy specification to provide guidance to the first device on how to perturb sensitive data. The first device then uses the guidance to transform sensitive data and provides it to the second device. The data transformation permits the first device to share sensitive data in a manner that preserves the privacy of the first user but permits statistics on aggregated data to be generated by an untrusted server.

21 Claims, 10 Drawing Sheets

(51) Int. Cl.

| | |
|---|---|
| *H04W 12/02* | (2009.01) |
| *H04W 12/00* | (2009.01) |
| *G06F 21/32* | (2013.01) |
| *G06Q 30/02* | (2012.01) |
| *H04W 4/21* | (2018.01) |
| *H04L 12/58* | (2006.01) |
| *G06Q 50/00* | (2012.01) |
| *H04L 29/08* | (2006.01) |
| *H04L 29/06* | (2006.01) |
| *G06F 16/951* | (2019.01) |

(52) U.S. Cl.
CPC ...... *G06F 21/6227* (2013.01); *G06F 21/6254* (2013.01); *G06F 21/6263* (2013.01); *G06Q 30/02* (2013.01); *G06Q 50/01* (2013.01); *H04L 51/32* (2013.01); *H04L 63/0407* (2013.01); *H04L 67/22* (2013.01); *H04L 67/303* (2013.01); *H04L 67/306* (2013.01); *H04W 4/21* (2018.02); *H04W 12/001* (2019.01); *H04W 12/02* (2013.01); *H04W 12/08* (2013.01); *G06F 2221/2111* (2013.01)

(56) References Cited

U.S. PATENT DOCUMENTS

| | | | |
|---|---|---|---|
| 8,881,230 B2 | 11/2014 | Maida-Smith et al. | |
| 9,032,544 B2 | 5/2015 | Shelton | |
| 9,195,721 B2 | 11/2015 | Matamala | |
| 2004/0117310 A1* | 6/2004 | Mendez | H04K 1/00 705/50 |
| 2008/0147684 A1* | 6/2008 | Sadovsky | H04L 67/22 |
| 2012/0084349 A1* | 4/2012 | Lee | G06Q 30/0251 709/203 |
| 2012/0109830 A1 | 5/2012 | Vogel | |
| 2012/0331567 A1 | 12/2012 | Shelton | |
| 2013/0006748 A1* | 1/2013 | Horvitz | G06Q 30/02 705/14.39 |
| 2013/0091210 A1 | 4/2013 | Rajakarunanayake et al. | |
| 2013/0097246 A1 | 4/2013 | Zifroni | |
| 2013/0298248 A1 | 11/2013 | Boldrev | |
| 2014/0067938 A1 | 3/2014 | Boldrev | |
| 2014/0171039 A1 | 6/2014 | Bjontegard | |
| 2014/0214895 A1 | 7/2014 | Higgins | |
| 2014/0230025 A1 | 8/2014 | Abhyanker | |
| 2015/0204676 A1 | 7/2015 | Zhang | |
| 2015/0227890 A1 | 8/2015 | Bednarek | |
| 2015/0347903 A1 | 12/2015 | Saxena | |
| 2016/0055571 A1 | 2/2016 | Wouhaybi | |
| 2016/0091879 A1 | 3/2016 | Marti | |
| 2016/0226985 A1 | 8/2016 | Yoon et al. | |
| 2017/0169200 A1* | 6/2017 | Tong | G06F 21/31 |
| 2017/0186123 A1* | 6/2017 | Shelton | G06Q 50/265 |

FOREIGN PATENT DOCUMENTS

| | | |
|---|---|---|
| WO | 2015-077542 | 5/2015 |
| WO | 2016-045071 | 3/2016 |

OTHER PUBLICATIONS

Written Opinion from International Application No. PCT/KR2017/003789 dated Jul. 10, 2017.

European Patent Office, "Supplementary European Search Report," Application No. EP17779375.9, dated Dec. 5, 2018, 7 pages.

* cited by examiner

Input: Users' locations $\{l_i \in \tau \subseteq \mathcal{L} : 1 \leq i \leq n\}$
Input: Users' privacy specifications $\{(\tau, \epsilon_i) : 1 \leq i \leq n\}$
Input: Confidence parameter $0 < \beta < 1$
Output: User counts f at different locations
1: Server calculates $\delta = \sqrt{\frac{\ln(2|\tau|/\beta)}{n}}$
2: Server calculates $m = \frac{\ln(|\tau|+1)\ln(2/\beta)}{\delta^2}$
3: Server generates a random matrix $\Phi \in \{-\frac{1}{\sqrt{m}}, \frac{1}{\sqrt{m}}\}^{m \times |\tau|}$
4: Server initializes z and f
5: for each user $u_i$ do
6:     Server randomly generates $j$ from $\{1, \cdots, m\}$
7:     Server sends $j$-th row $\Phi_{j,\cdot}$ of $\Phi$ to $u_i$
8:     $u_i$ returns $z_i = \text{LR}(\Phi_{j,\cdot}, l_i, \epsilon_i)$ to server
9:     Server adds $z_i$ to $j$-th bit of z
10: end for
11: for each location $l_k \in \tau$ do
12:    Server sets $k$-th element of f to $\langle \Phi e_{l_k}, \mathbf{z} \rangle$
13: end for
14: return f

FIG. 4A

Input: $d$-bit string $\mathbf{x} \in \{-\frac{1}{\sqrt{m}}, \frac{1}{\sqrt{m}}\}^d$
Input: User $u_i$'s location $l_i$
Input: User $u_i$'s privacy parameter $\epsilon_i$
Output: Sanitized bit $z_i$
 1: Generate the standard basis vector $e_{l_i} \in \{0,1\}^d$
 2: $x_{l_i} = \mathbf{x}^\top e_{l_i}$
 3: Randomize $x_{l_i}$ as:

$$z_i = \begin{cases} c_{\epsilon_i} m x_{l_i} & \text{with probability } \frac{e^{\epsilon_i}}{e^{\epsilon_i}+1} \\ -c_{\epsilon_i} m x_{l_i} & \text{with probability } \frac{1}{e^{\epsilon_i}+1} \end{cases}$$

where $c_{\epsilon_i} = \frac{e^{\epsilon_i}+1}{e^{\epsilon_i}-1}$
 4: return $z_i$

FIG. 4B

Input: A set of $n$ users with privacy specifications $\{(\tau_i, \epsilon_i) : 1 \leq i \leq n\}$ and locations $\{l_i \in \tau_i : 1 \leq i \leq n\}$
Input: Confidence parameter $\beta$
Output: Sanitized counts for all locations $\{\tilde{s}_l : l \in \mathcal{L}\}$
 1: for each user $u_i$ do
 2:    Send $(\tau_i, \epsilon_i)$ to server
 3: end for
 4: Server divides users into different groups
 5: Server partitions user groups into clusters $\mathcal{C}$
 6: for each cluster $C_j \in \mathcal{C}$ do
 7:    Server applies PCE to $C_j$ with confidence level $\frac{\beta}{|\mathcal{C}|}$;
 8: end for
 9: Server calculates the sanitized counts for all locations
10: Server enforces consistency on the sanitized counts
11: return $\{\tilde{s}_l : l \in \mathcal{L}\}$

FIG. 4C

```
Input: A set of user groups U_1, ..., U_k
Input: Confidence parameter β
Output: User clusters C = {C_1, ..., C_m}
 1: C = {C_1, ..., C_k} where C_i = U_i for i = 1, ..., k
 2: Calculate the error err(C_i) of each cluster C_i ∈ C using
    confidence parameter β/m
 3: Calculate the error err(p) of each path p ∈ T by
    Σ_{C_i ∈ C_p} err(C_i)
 4: l_max = max_{p ∈ T} err(p)         //maximum error of all paths
 5: while true do
 6:    Calculate err(C_i) for each C_i using confidence level β/m
 7:    Calculate err(p) for each valid path p by Σ_{C_i ∈ C_p} err(C_i)
 8:    for each valid path p ∈ T do
 9:       for each pair of clusters C_s, C_t ∈ C_p, s ≠ t do
10:          if the pair (C_s, C_t) were not visited then
11:             //assume that the region of C_s contains that of C_t
12:             Calculate the error err'(p) of each valid path p ∈ T
                provided this pair would be merged:
                err'(p) = err(p)
                err'(p) -= err(C_s) - err(C_s ∪ C_t) if C_s ∈ C_p
                err'(p) -= err(C_t) if C_t ∈ C_p
13:             l_{s,t} = max_{p ∈ T} err'(p)
14:             Mark (C_s, C_t) as visited
15:          end if
16:       end for
17:    end for
18:    if the minimum of l_{s,t} is smaller than l_max then
19:       Merge the two clusters resulting in the minimum of l_{s,t}
20:       Set l_max as the minimum of l_{s,t}
21:    else
22:       break
23:    end if
24: end while
25: return C
```

FIG. 4D

Each user specifies their own safe zone and precision parameter with respect to a taxonomy, which is sent to the second device
505

The second device groups users having the same safe zone into a group and encodes locations within a tree taxonomy
510

For each user group, the second device invokes a protocol to estimate the number of users in each section of a group's safe zone and sends at least one bit representing the encodings
515

The first device invokes a local randomizer to randomize sensitive data based on the at least one bit
520

The untrusted server aggregates the perturbed bits from first devices, aggregates them and calculates sanitized counts
525

FIG. 5

PRIVATE DATA AGGREGATION FRAMEWORK FOR UNTRUSTED SERVERS

CROSS REFERENCE TO RELATED APPLICATIONS

The present application claims the benefit of U.S. Provisional Application No. 62/319,637, filed Apr. 7, 2016, the entire contents of which are hereby incorporated by reference.

FIELD OF THE INVENTION

An embodiment of the present invention is generally related to techniques to improve data privacy in applications such as crowdsourcing. More particularly, an embodiment of the present invention is directed to improving privacy of data provided to an untrusted server for data aggregation.

BACKGROUND OF THE INVENTION

The fast penetration of the Internet and mobile devices has allowed users to easily contribute their various personal data to different crowdsourcing applications that aggregate data from different users and provide a service. As an illustrative example, there are services that aggregate traffic data from multiple users to provide information on real-time traffic flow.

Many types of personal data are inherently sensitive, making privacy concerns a major impediment to the wider acceptance of crowd-sourcing based applications. Data sharing in a crowd-sourced based application often corresponds to a local setting where a user is typically willing to share his information only if it has been sanitized before leaving his own device. However, conventional approaches to privacy protection have various deficiencies.

BRIEF DESCRIPTION OF THE DRAWINGS

FIG. 4A illustrates an exemplary personalized count estimation algorithm in accordance with an embodiment.

FIG. 4B illustrates an exemplary local randomizer algorithm in accordance with an embodiment.

FIG. 4C illustrates an algorithm of a private spatial data aggregation framework to determined sanitized counts in accordance with an embodiment.

FIG. 4D illustrates an exemplary clustering algorithm in accordance with an embodiment.

FIG. 5 illustrates a method of providing data protection based on a personalized privacy specifications using a personalized local differential privacy model and a personalized count estimation protocol in accordance with an embodiment.

DETAILED DESCRIPTION

Figure 1A:
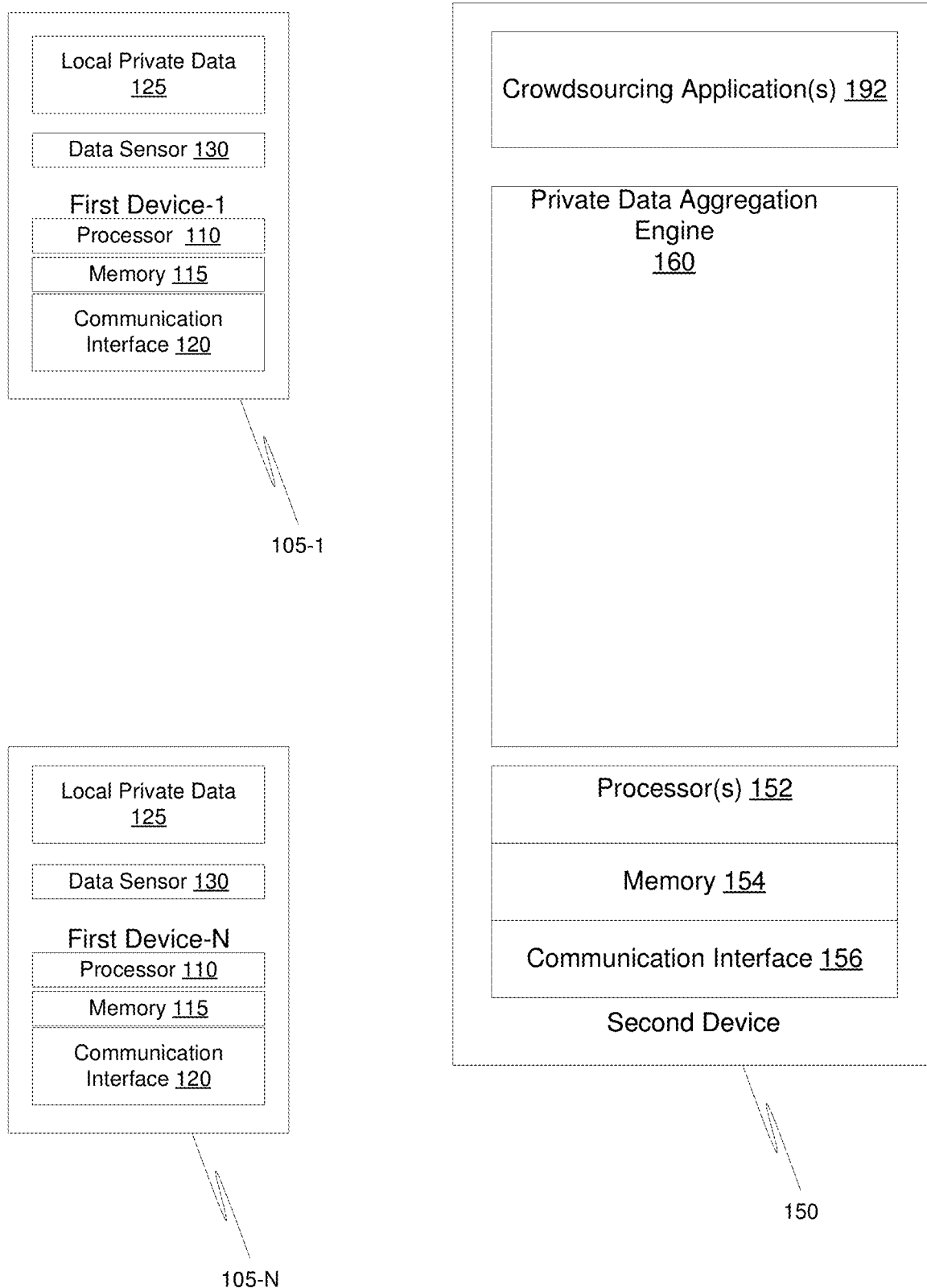
FIG. 1A illustrates a general system environment for private data aggregation by an untrusted server in accordance with an embodiment.

FIG. 1 illustrates an embodiment of a system environment in which a second device 150 (e.g., an untrusted server) receives data from a set of individual first devices 105, such as first device 105-1 to first device 105-N. Each individual first device 105 has a processor 110, memory 115, and communication interface 120.

Each individual first device 105 has local private data 125. As illustrative (but non-limiting) examples, the private data 125 of an individual first device 105 may be generated by a local sensor 130 or via access to local sensor data. For example, the local private data 125 may be based on local sensor data that may include biometric information about a user (e.g., heart rate or other health data), position data, device operation attributes of a smart device (e.g., power consumption data of a smart meter or content consumed by a smart TV). However, more generally the local private data 125 may be any type of local data that a user associated with a first device 105 may not want to share without privacy safeguards.

Illustrative examples of individual first devices 105 include a smart phone, smart watch, tablet computer, laptop computer, a computing device onboard a car with smart electronics, and a computing device embedded in a smart home appliance, such as a Smart TV, a smart power monitor, and a health monitor. While the set of N individual first devices 105 may be the same type of device, more generally they may comprise a mixture of different device types (e.g., a mixture of smart watches and smart phones).

The second device 150 includes at least one processor 152, memory 154, and a communication interface 156. The second device may be implemented as one or more servers and associated databases. The second device includes a private data aggregation engine 160 to support a private data aggregation framework, as will be discussed below in more detail. The private data aggregation engine 160 may be implemented in firmware or as software modules having computer program instructions residing in a non-transitory computer readable medium executable by the at least one processor 152. In one embodiment, the second device 150 aggregates data for one or more crowdsourcing applications 192, which may reside either on the second device 150 or on another server (not shown).

Figure 1B:
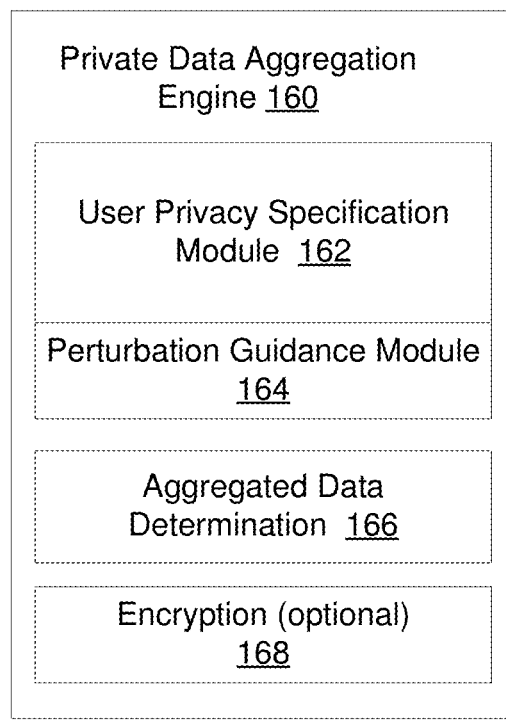
FIG. 1B illustrates an exemplary but non-limiting private data aggregation engine of FIG. 1A engine in accordance with an embodiment.

FIG. 1B illustrates an exemplary set of functional modules of the private data aggregation engine 160 in accordance with an embodiment to provide an overview of some aspects at a high level. In one embodiment, the private data aggregation engine 160 provides a data aggregation framework for the second device to collect aggregated statistics without learning any first device user's true local private data 125. A user privacy specification module 162 permits each individual user of a first device 105 to specify personalized privacy requirements. In one embodiment the personalized privacy specification includes at least a safe zone and a precision parameter, as will be discussed below in more detail. The safe zone specifies a disclosure granularity of the private data 125 in regards to what degree of granularity of detail a user is comfortable sharing. The precision parameter controls disclosure of levels of granularity within a safe zone.

A perturbation guidance module 164 provides instructions to each first device 105 to perturb local private data 125, prior to transmission to the second device, 150 in accordance with the privacy specification selected by each user. A data aggregation module 166 aggregates the perturbed to obtain aggregated information without learning any user's true data. That is, an overall user distribution of a data value over a domain is acquired without learning any user's individual data value. In one embodiment, the perturbation guidance module 164 provides information for a local randomizer on each first device 105 to randomize private data according to a probability function, as will be discussed below in more detail. In one embodiment, an aggregated data determination module 166 determines aggregated statistics from a set of first devices 105. An optional encryption module 168 may be provided to support encryption of data as an additional layer of privacy protection.

Figure 2A:
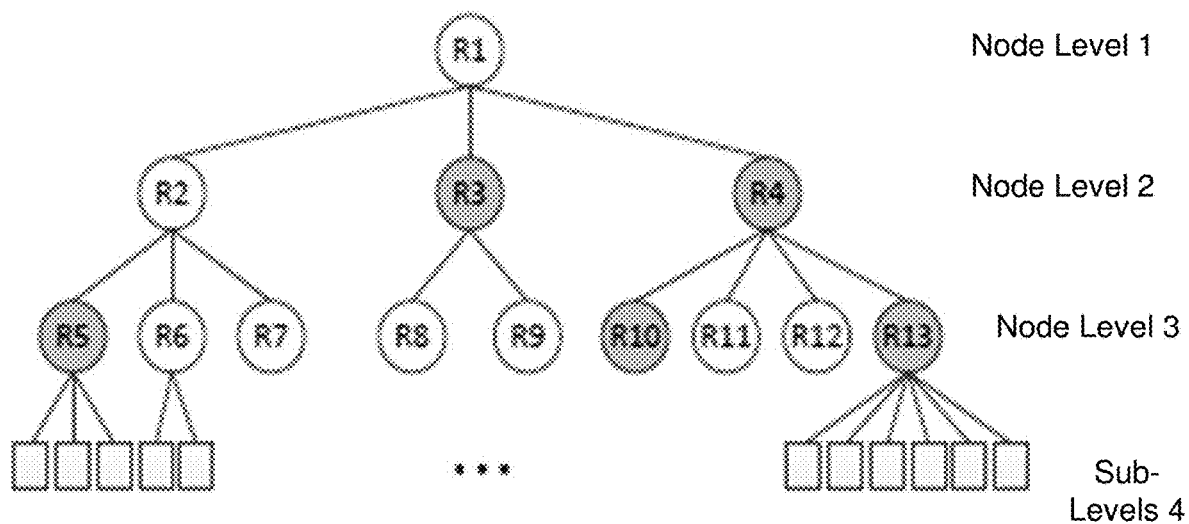
FIG. 2A illustrates a general tree taxonomy in accordance with an embodiment.

In one embodiment, a privacy specification corresponds to a selection of parameters within at least one taxonomy. FIG. 2A illustrates an exemplary general taxonomy having a sequence of node levels. In this example, the taxonomy has nodes in a tree structure in which the taxonomy is data independent. A user specifies a node in the taxonomy (e.g., a node at node level 3, such as node R13). The node specified by the user defines a safe region. In one embodiment, a user also specifies a precision parameter that specifies a sub-level of granularity within a safe zone that a user is willing to reveal. Among other things, the precision parameter limits an adversary's capability of distinguishing finer levels of detail within the safe zone.

Figure 2B:
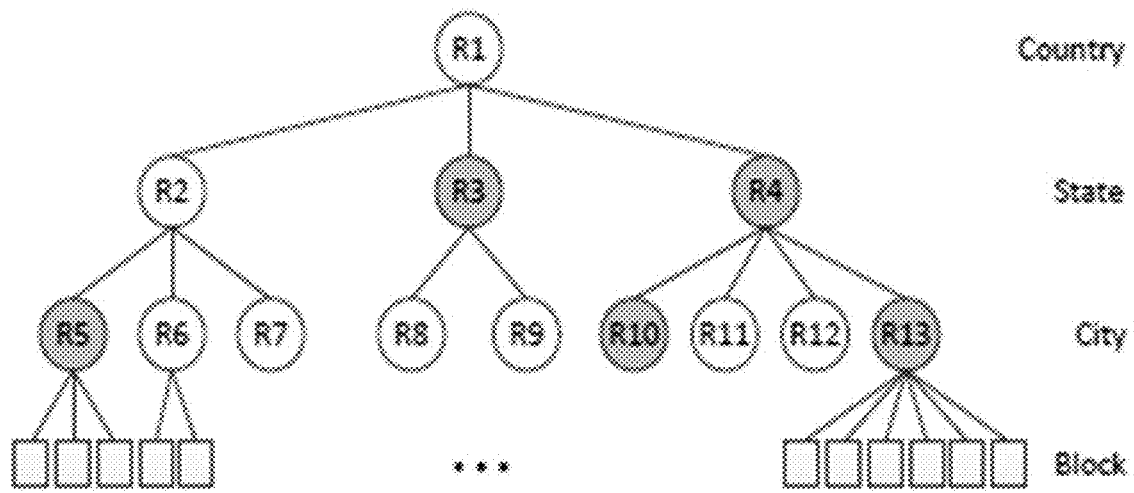
FIG. 2B illustrates a location taxonomy in accordance with an embodiment.

FIG. 2B illustrates an example of a taxonomy in which the nodes correspond to different levels of granularity regarding a user's location. In this example, the taxonomy has levels of country, stage, city, and block. For example, a user may be willing to permit their location to be defined at a city level but not at some finer level of detail within the city, such as at a block level. Thus, in this example, the safe zone corresponds the selection of a city and the precision parameter corresponds to a level of granularity at a block level within the safe zone.

Figure 2C:
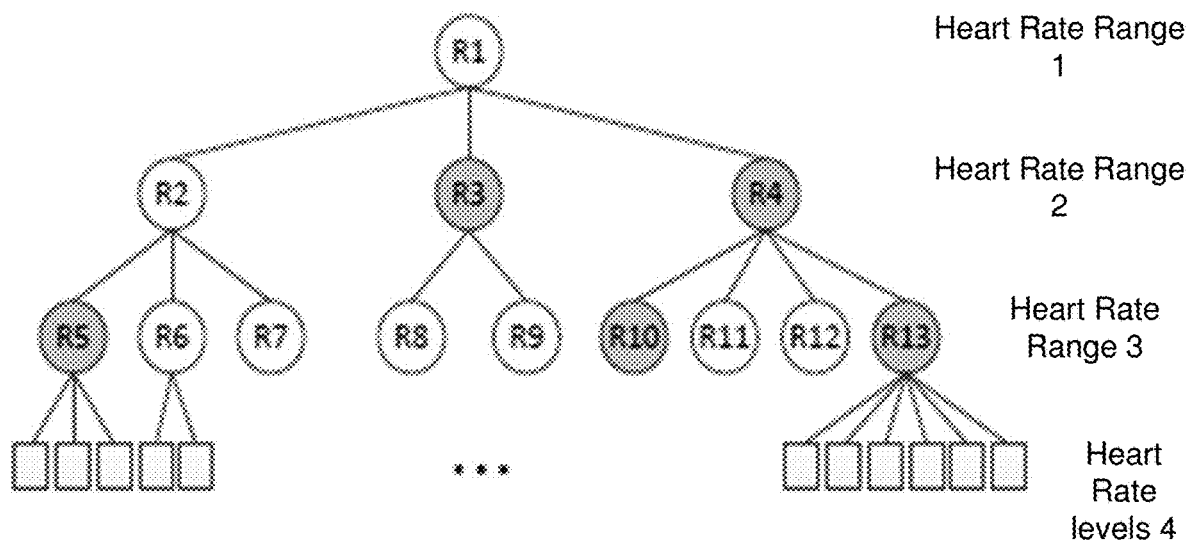
FIG. 2C illustrates a biometric data taxonomy in accordance with an embodiment.

FIG. 2C illustrates a taxonomy in which the nodes correspond to different categories and sub-categories of a user's heart rate as measured by a sensor. For example, a user may desire to specify a safe zone specifying a range of heart rates and a precious parameter limiting the extent to which their heart rate can be determined at a finer level within the safe zone.

In the most general case, a user may have an arbitrary number of different types of local private data. For example, for the case of a user walking or driving with a smart phone there may be location data and biometric data (e.g., the users' heart rate). In one embodiment, for the case of two or more different types of private data 125, a user of a first device 105 may select a privacy specification for two or more different types of local data. In the most general case each type of local private data may have its own privacy specification represented with its own safe zone and precision parameter. For the case that there are two or more different taxonomies, the privacy specifications for the combination all of the different types of local private data to be shared may be represented by a Cartesian product of the individual taxonomies for each type of data. For example, a first taxonomy may have a tree structure related to location and a second taxonomy may correspond to an indicator of a stress-level of the user.

Figure 3:
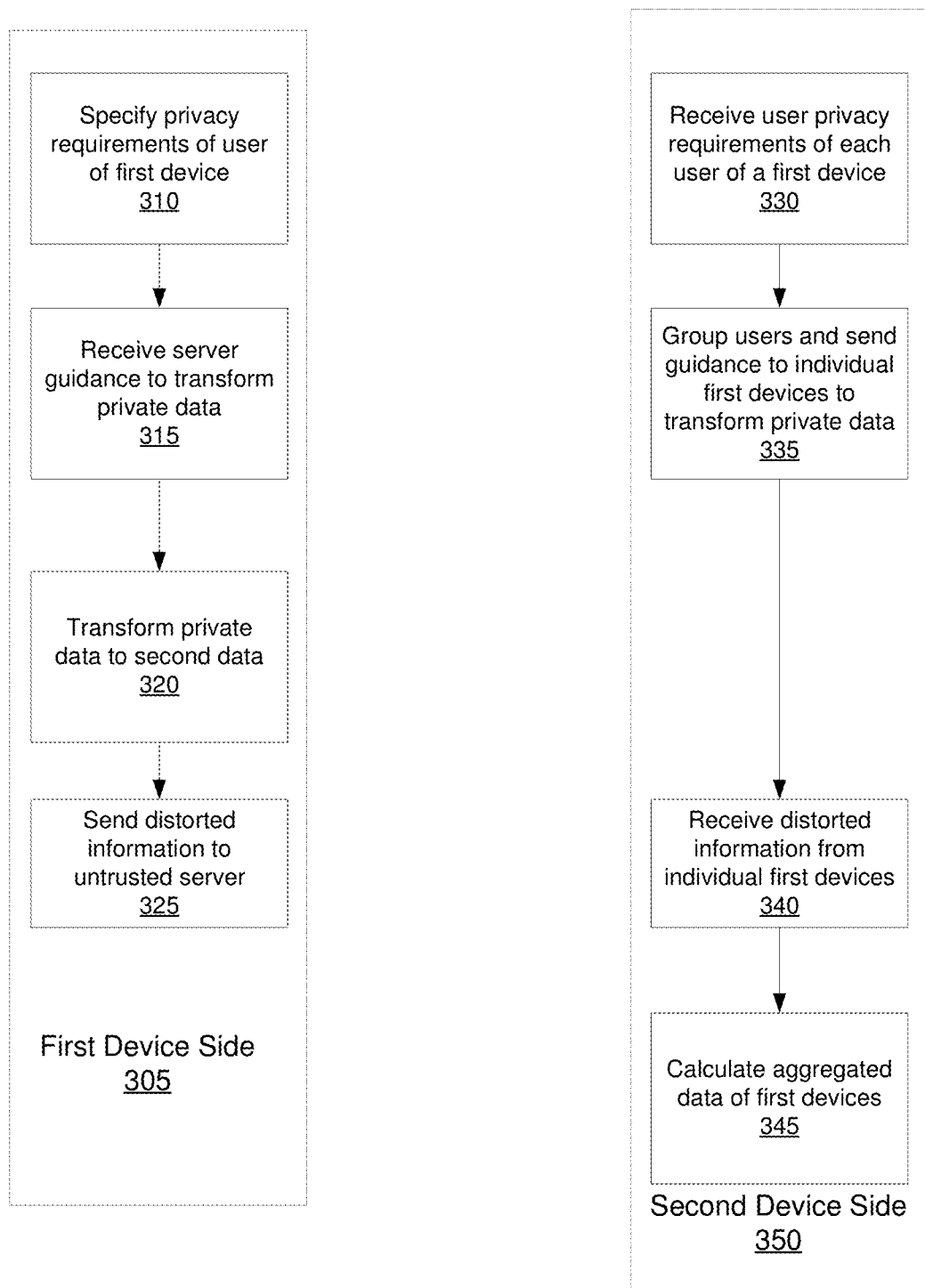
FIG. 3 illustrates a method of providing data protection for private data aggregation based on personalized privacy specifications in accordance with an embodiment.

FIG. 3 illustrates a method in accordance with an embodiment. Block 305 illustrates actions occurring at an individual first device 105. Block 350 illustrates actions occurring at the second device 150 (e.g., an untrusted server) interacting with a set N, of individual first devices 105.

On the first device side of block 305, an individual user at a first device 105 can specify personalized privacy requirements 310 for each type of local private data to be shared in terms of at least safe zone and a precision parameter. The privacy specification is provided to the second device 150. In one embodiment, a user interface is provided for a user to specify his/her personalized privacy requirements in terms of at least two parameters that describe a safe zone and a precision parameter.

The first device 105 receives guidance 315 from the second device 150 on how to perturb sensitive data prior to transmission to the second device 150. The first device sends perturbed (distorted) data 320 that has been transformed as per the second device's guidance. In one embodiment, the transformation converts a true value of sensitive local private data 125 into a perturbed probability distribution. In this embodiment, the perturbed probability distribution permits recovery of aggregated statistics from devices in the same safe zone but preserves the privacy of an individual user's sensitive local private data 125.

On the second device side in block 350, the second device 150 receives the user privacy requirements 330 from each individual user first device 105, where in the most general case there a number, N, of different user instances. In one embodiment, the second device 150 groups users of the first devices 335 based on the attributes of each user's privacy specification and sends guidance for perturbing data to first devices 105 in each group. The second device 150 receives distorted data from first devices in individual groups and calculates 345 aggregated data for each group.

Many optimizations and variations of the basic method of FIG. 3 are contemplated. In one embodiment, default values of the privacy specification may be employed. For example, a user may be provided with an option to either use default settings or to customize their privacy specification. Another option is to use information from a user's previous privacy selections to determine default settings. That is, a user's previous privacy settings may be used to determine default settings for the same type of data. Additionally, the user's previous privacy specification may also be used to infer a default setting, for a different type of data, reflecting the user's general degree of concern about privacy as inferred from previous transactions.

The grouping of users 335 may be performed in different ways. In one embodiment, the second device 150, in response to receiving the user privacy requirements, encodes all possible values in a domain, divides users into different groups, and sends perturbation guidance to users in the same group.

The guidance 315 received by a first device to transform sensitive data may be provided in different ways as an implementation detail. As illustrative examples, the perturbation guidance may include software code or instructions for each individual first device 105 to calculate a transformation of sensitive local private data 125. However, more generally it will be understood that after an initial setup procedure that the perturbation guidance may comprise a set of bits or a bitstring for a local randomizer on a first device 105 to perform the transformation.

The calculation of aggregated data may be performed in different ways. In one embodiment, the second device 150 receives perturbed data from individual first devices 105, and generates a data distribution of all users' values. For each group of first devices 105, the second device 150 collects the distribution of the group's true values. The second device 150 integrates the results of all groups to generate final statistics.

An exemplary (but non-limiting) set of example applications will now be described in which individual users specify a personalized privacy specification which is then used to protect sensitivity data according a local differential privacy protection protocol.

In one embodiment, spatial data aggregation is performed for navigation applications. In one embodiment, a first device 105 (e.g., a user's smartphone or smart watch) contributes its current location to an untrusted second device 150 (e.g., navigation service providers). By aggregating different users' locations, the second device can, for example, generate a traffic congestion map. Each users' privacy is protected as the true locations are properly perturbed before they leave their respective first devices. In this example, the taxonomy may be a tree representing geographical levels of detail. A user then selects a safe zone, corresponding to a geographical level of detail. The user than further selects a precision parameter. The aggregated data from different devices 105 is then used to generate a map of traffic congestion.

As another example, the first devices 105 may be Smart TVs. Data from individual Smart TVs may be collected for data analytics and advertising. A second device 150 (e.g., a smart TV analytical data server) collects different aggregated statistics (e.g., different audience measurements) from smart TVs without learning users' sensitive information (e.g., the programs being watched by individual users).

In one embodiment the taxonomy for Smart TVs includes different levels related to levels of detail describing smart TV content. For example, a first level could be any program. A second level could be a set of high level program categories, such as Music, Sports, Gaming, Movies, TV shows, and News. A third level could include, for each category in the second level, subcategories. For example: Movies could be further divided into animation, action, comedy etc. A fourth level could, for example, include further subcategories of each subcategory. U user then selects a safe zone within the taxonomy, and a precision parameter.

As another example, the first devices 105 may be smart utility meters. A second device 110 (e.g., an energy supplier, such as an electric company) monitors energy consumption at each household at different times and matches consumption with power generation or adjusts time-based energy rates. For example, individual users may desire to select a privacy specification for a smart utility meter based on various concerns, such as whether leaking a household's power consumption may reveal whether a family is away from home. The taxonomy may, for example, provide different levels of location detail or ranges of power consumption that the user is comfortable revealing. In this example, the safe zone and precision parameter are selectable to provide privacy protection while permitting aggregated statistics to be collected.

As another example, the first devices 105 may collect or have access to health data of a user. In one embodiment, a calculation of the stress level of a user is compared to his heart rate variability with the average of a large group of healthy people in his age group. Each user specified a privacy specification for each type of sensitive data that is shared. A second device 150 (e.g., a health server) collects users' heart rate variability and age data, which is then be used to compute a user's stress level on device. The data collection process does not leak any user's true heart rate variability or age to the second device.

A yet another example, different types of data (composite data) may be collected. For example, different types of biometric data may be collected to provide unified services. As a first illustrative example, health data from smart watches, pulse oximeters and blood pressure monitors may be shared, to enable unified services. However, sharing such synchronized and integrated data to untrusted servers brings huge privacy threats. Privacy concerns can be addressed by distorting a user's true (composite) data before sending it to any untrusted server while still enabling desirable services/data analysis tasks on the server side. For example, each user may specify a personalized privacy specification for each type of composite data and personalized privacy protection provided to each user.

Examples of specific techniques to group users, transform data on individual devices, and generate aggregated statistics will now be described in regards to a local differential privacy model using a personalized count estimation protocol in a data aggregation framework. An illustrative example is provided for providing protection for a location although it will be understood that the location is merely an example of a data type and other types of data may be substituted into the algorithm.

In one embodiment, a personalized local differential privacy model is used in which each user specifies their personalized privacy requirement, independent of other user's privacy setting. A taxonomy has nodes in a tree structure in which the taxonomy is data independent. A user, at a first device 105, specifies a node in the taxonomy that defines a safe region and a second parameter that limits an adversary's capability of distinguishing finer levels of detail within the selected node. Given a personalized privacy specification of a user, a randomization algorithm satisfies the personalized local differential privacy. In one embodiment, the final statistics learned by the untrusted server are guaranteed to satisfy the personalized local differential privacy and prevent the discovery of any user's true data. Aspects of the algorithm may be selected to guarantee a desired degree of accuracy.

In one embodiment, users are grouped into different invocations of a personalized count estimation (PCE) protocol. In one embodiment, a local randomizer on each first device 105 perturbs local data to implement the personalized local differential privacy. In this embodiment, the second device 150 (an untrusted server) computes a random matrix. The users are clustered into user groups according to the safe zones. In one embodiment, the PCE protocol is applied to user groups. In one embodiment, each set of users who specify the same node in the taxonomy as their safe region is defined as a user group. More generally, clusters of users may be defined based on efficiency considerations and a maximum allowed error consideration.

In one embodiment, each user (via a respective first device 105) sends his/her personalized privacy specification to the second device 150 (e.g., an untrusted server). After receiving privacy specifications from all users, the second device 150 divides the user into different user groups according to their safe regions: all users within the same safe region form a user group. After that, the second device 150 partitions the user groups into different clusters. For each cluster, the second device 150 applies the PCE protocol to estimate a user distribution to the cluster. A confidence parameter $\beta$ is used for each cluster, $C_i$, to specify a confidence parameter $\beta/|c|$ for each invocation of the PCE protocol to establish an overall confidence factor $\beta$.

FIG. 4A shows an exemplary personalized count estimation algorithm in accordance with an embodiment. The general idea of the PCE protocol is to apply dimensionality reduction techniques (e.g., the Johnson-Lindenstrauss transform) to project the input data (e.g., location if the user's private data corresponds to a location) into a space of lower dimension and collect the users' data in this new space in which the user's data is perturbed by a probability distribution. In the example of FIG. 4A, the user's data corresponds to a location, although it will be understood that the algorithm could be applied to other types of data. The algorithm takes as inputs the users' locations $\{li \in \tau \subseteq L: 1 \leq i \leq n\}$, their personalized privacy specifications $\{(\tau, \varepsilon i): 1 \leq i \leq n\}$ (wherein $\tau$ corresponds to the safe zone and $\varepsilon i$ is the precision parameter), and a confidence parameter $\beta$ that affects the accuracy level, and returns the estimated user counts, f, for all locations in $\tau$.

In one implementation, the assumption is made that all input users are of the same safe zone region $\tau$. An intermediate variable $\delta$ is calculated (step 1) and then a parameter m is calculated (step 2). A dimensionality reduction is conducted by building a random matrix $\phi$ (step 3) with entries randomly drawn from $$\left\{-\frac{1}{\sqrt{m}}, \frac{1}{\sqrt{m}}\right\}.$$

In step 4, second device 150 initializes two variables, z that contains intermediate information used to estimate the user distribution and f that contains the counts to return, into size-m of vectors of 0's. For each user $u_i$ participating in the protocol, the server generates an index j uniformly at random from $\{1, \ldots, m\}$ and sends the j-th row of $\phi j$ to $u_i$, which $u_i$ perturbs according to his/her true location by a local randomizer in a first device 105.

FIG. 4B shows an exemplary local randomizer algorithm in accordance with an embodiment, which may be implemented in an individual first device 105. The inputs include a d-bit string, the user's location, and the user's privacy parameters. The local randomizer then generates a standard basis vector that has a 1 in the i-th position and 0's elsewhere. Using the standard basis vector t selects a random bit $xl_i$. Then $xl_i$ is randomized into a new bit z, which is then returned to the second device 150.

FIG. 4C illustrates an algorithm of a private spatial data aggregation framework to determined sanitized counts in accordance with an embodiment. Each user sends his/her personalized privacy specification to the second device 150. After receiving the specifications from all users, the second device 150 divides them into different user groups according to their safe regions. In one embodiment, all users with the same safe region form a user group. After that, the second device partitions the user groups into different clusters. For each cluster, the second device 150 applies the PCE protocol to estimate the user distribution within the cluster. The confidence parameter $\beta/|C|$ is used for each invocation of the PCE protocol so as to establish the overall confidence level $\beta$. By combining the estimates from all clusters, the second device obtains the sanitized counts for all locations in the universe. The sanitized counts are calculated. A post-processing technique may be used to enforce the consistency of sanitized count. This is because it is possible, in some instances, that there be an inconsistency in the estimated counts, due to various potential error sources in the PCE protocol.

FIG. 4D illustrates an exemplary clustering algorithm in accordance with an embodiment. A clustering algorithm is useful to feed different user instances into different invocations of the PCE protocol to maximize the resulting utility based on processing efficiency and a maximum absolute error (MAE).

One option is to directly feed all users and the entire location universe into the PCE protocol, which represents the "coarsest" solution. However, this scheme does not take full benefit of the users' personalized privacy requirements (i.e., the more fine grained safe regions specified by users). Another option is to apply the PCE protocol to each set of users who specify the same node in the spatial taxonomy as their safe region, representing the "finest" solution. That is, a cluster could correspond to a user group. However, in some cases it is possible to cluster some user groups to achieve a smaller error. That is, the users may also be clustered with the goal of minimizing the MAE.

In FIG. 4D, the clustering algorithm calculates an optimal set of clusters for a set of user groups based on a confidence parameter. The user group clustering problem is an optimization problem. Given a spatial taxonomy T, a confidence parameter $\beta$, and a set of user groups U1, U2, . . . , Uk, the problem then is to partition the k user groups into m ($1 \leq m \leq k$) clusters C=$\{$C1, C2, . . . , Cm$\}$ based on optimization of an error function. For each cluster (line 2), its PCE protocol is assigned a confidence parameter $\beta$ in order to achieve the overall confidence level $\beta$. Each path, p, leads to a distinctive location in the universe, minimizing the MAE.

The clustering algorithm determines whether or not to merge clusters using an interactive technique. In each iteration, the algorithm considers all cluster pairs derived from each valid path's Cp. The algorithm avoids repeated computations by marking an already evaluated pair as visited (Lines 10 and 14). For each candidate cluster pair, the algorithm explicitly calculates the errors of all resulting clusters and then the errors of all valid paths provided the merging happens. The number of valid paths is bounded by the number k of user groups.

While an exemplary PCE protocol has been described, it will be understood that many variations are possible and that embodiments of the present invention are not limited to the particular algorithms described.

Referring to FIG. 5, an exemplary method of data aggregation from the perspective of first devices 105 and the second device 150 will now be described in terms of the PCE framework and an example in which the user shares position location data, although it will be understood that other types of data may be shared besides location data. In one embodiment, interaction between a first device 105 and the second device 150 based on the PCE protocol is given as follows.

A user specifies 505 his safe zone and precision parameter on his first device 105 (e.g., a smartphone). The user's safe zone $\tau$ is selected as a node in the domain taxonomy that covers his true location, as illustrated in FIG. 2A. For example, a user could choose his safe zone to be node R5, meaning that he/she feels comfortable to let others know that his/her private data is in R5, but not any more fine-grained regions (e.g., the blocks under R5). The user can then give a second precision parameter $\varepsilon$ to limit an adversary's capability of distinguishing any two sub-levels within his/her safe zone $\tau$. The ($\tau$, $\varepsilon$) pair defines the user's personalized privacy specification. Different users can specify different privacy preferences independent of other users' privacy settings. The user sends the ($\tau$, $\varepsilon$) pair to the second device 150.

Upon receiving the users' privacy settings, the second device 150 puts the users with the same safe zone into a group 510. Optional procedures could be conducted to form larger user groups with the goal of improving accuracy, such as by using the clustering algorithm described above. In one embodiment, the second device 150 encodes all locations into m-bit vectors where m=O(n) with n being the number of users. Each bit of such a vector takes value of either $$-\frac{1}{\sqrt{m}} \text{ or } \frac{1}{\sqrt{m}}.$$

For each user group, the second device 150 invokes 515 a PCE protocol whose goal is to estimate the number of users at each location of the group's safe zone. In the PCE protocol, the second device sends the jth bits of the encodings of all locations in the safe zone, where j is a random number. The first device 105 invokes a local randomizer 520 that identifies the jth bit of the encoding of its true location, denoted by xj. The local randomizer of the first device 105 perturbs xj as:

$$z_j = \begin{cases} c_\epsilon m x_j \text{ with probability} \frac{e^\epsilon}{e^\epsilon + 1} \\ -c_\epsilon m x_j \text{ with probability} \frac{1}{e^\epsilon + 1} \end{cases}$$

where $c\epsilon=(e\epsilon+1)/(e\epsilon-1)$. The first device 105 returns zj to the second device 150.

After receiving the perturbed bits from all first devices, the second device 150 aggregates 525 the perturbed bits to calculate the sanitized counts for all locations. An optional post-processing step may be conducted to enforce consistency constraints based on the domain taxonomy.

While the invention has been described in conjunction with specific embodiments, it will be understood that it is not intended to limit the invention to the described embodiments. On the contrary, it is intended to cover alternatives, modifications, and equivalents as may be included within the spirit and scope of the invention as defined by the appended claims. The present invention may be practiced without some or all of these specific details. In addition, well known features may not have been described in detail to avoid unnecessarily obscuring the invention. In accordance with the present invention, the components, process steps, and/or data structures may be implemented using various types of operating systems, programming languages, computing platforms, computer programs, and/or computing devices. In addition, those of ordinary skill in the art will recognize that devices such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

What is claimed is:

1. A data protection method, comprising:
receiving, at a second device, an individual privacy specification from a first device of a plurality of devices, wherein the individual privacy specification is independently specified, with respect to other devices of the plurality of devices, from a selection of privacy options;
group the first device with a portion of the plurality of devices that share a node of a taxonomy as indicated by the individual privacy specification, the taxonomy is selected based on a category of device data of the first device to be collected by the second device;
sending, to the first device, guidance to transform the device data, the guidance representing instructions to distort the device data according to the node of the taxonomy that the first device is grouped based on the individual privacy specification; and
receiving, at the second device, the transformed device data of the first device,
wherein the guidance enables recovery of aggregated statistics from the device data while preserving privacy according to the individual privacy specification of the first device.

2. The data protection method of claim 1, wherein the individual privacy specification includes a) a safe zone specifying disclosure granularity of the device data and b) a precision parameter controlling disclosure of levels of granularity within the safe zone.

3. The data protection method of claim 1, further comprising:
integrating, by the second device, the transformed device data with other transformed device data from other devices of the plurality of devices to generate the aggregated statistics for the plurality of devices with a same safe zone.

4. The data protection method of claim 3, wherein each group of
the plurality of devices share the same safe zone.

5. The data protection method of claim 3, wherein the guidance sent to each of the plurality of devices is selected for the second device to generate the aggregated statistics without an ability to infer the device data of each of the plurality of devices.

6. The data protection method of claim 1, wherein the guidance received by first device provides data to transform the device data of the first device to satisfy a local differential privacy based on the individual privacy specification of the first device.

7. The data protection method of claim 2,
wherein the individual privacy specification corresponds to a selection within the taxonomy where the safe zone corresponds to a node within the taxonomy, and
wherein the precision parameter limits a capability of a third party of distinguishing levels within the safe zone.

8. The data protection method of claim 1, wherein the guidance comprises information to perform a randomization of the device data with a probability function that takes an input bit string and outputs a sanitized bit or bit string.

9. A data protection method, comprising:
providing, by a first device of a plurality of devices, a privacy specification of the first device to a second device, the privacy specification including a safe zone specifying disclosure granularity of device data and a precision parameter controlling disclosure of levels of granularity within the safe zone, wherein the privacy specification of the first device is independently specified, with respect to other devices of the plurality of devices, from a selection of privacy options;
receiving, from the second device, guidance to transform device data, the guidance representing instructions to distort the device data according to a node of a taxonomy that the first device is grouped based on the privacy specification of the first device, wherein the node that the first device is grouped includes a portion of the plurality of devices based on individual privacy specifications of the plurality of devices, wherein the taxonomy is selected based on a category of the device data of the first device that is collected by the second device;

transforming, at the first device, the device data to protect the device data consistent with the privacy specification of the first device based on the guidance; and sharing the transformed device data with the second device, wherein the guidance enables recovery of aggregated statistics from the device data while preserving privacy according to the privacy specification of the first device.

10. The data protection method of claim 9, wherein a user interface is provided for a user of the first device to specify parameters of the privacy specification.

11. The data protection method of claim 9, wherein transforming randomizes sensitive data to satisfy a local differential privacy based on the privacy specification specified by a user of the first device.

12. The data protection method of claim 9, wherein the privacy specification corresponds to a selection within the taxonomy where the safe zone corresponds to a node within the taxonomy, and wherein the precision parameter limits a capability of a third party of distinguishing levels within the safe zone.

13. The data protection method of claim 9, wherein transforming comprising performing a randomization with a probability function that takes an input bit string and outputs a sanitized bit or bit string.

14. A device, comprising:

a memory configured to store information;

a processor coupled to the memory, the processor configured to:

receive personalized privacy requirements from a plurality of first devices, wherein each of the personalized privacy requirements includes a) a safe zone and b) a precision parameter controlling disclosure of levels of granularity within the safe zone;

group the plurality of first devices into multiple groups, where each group of the multiple groups share a node of a taxonomy as indicated by the safe zone of the personalized privacy requirements, the taxonomy is selected based on a category of device data of the plurality of first devices to be collected; and provide the information to each of the plurality of first devices, the information includes instructions to distort device data and perform a randomization to sanitize data in a manner consistent with the personalized privacy requirements of each of the plurality of first devices, wherein the randomization permits generating aggregated statistics for the data sent from the plurality of first devices and prevents ascertaining the data of the plurality of first devices by preserving privacy according to the node of the taxonomy that each of the plurality of first devices are grouped based on the personalized privacy requirements of each of the plurality of first devices.

15. The device of claim 14, wherein the processor is configured to provide the information to each of the plurality of first devices for a local randomizer on each of the plurality of first devices to sanitize the data consistent with the personalized privacy requirements associated with each of the plurality of first devices.

16. The device of claim 14, wherein:

the plurality of first devices within each of the multiple groups include the same safe zone, and the processor is configured to generate the aggregated statistics for the plurality of first devices according to each group of the plurality of first devices with the same safe zone.

17. The device of claim 16, wherein the processor is configured to organize the multiple groups into clusters to minimize a maximum absolute error of the aggregated statistics.

18. A data protection system, comprising:

an untrusted server, comprising at least one processor, a memory and a communication interface; and computer program instructions, stored on a non-transitory computer readable medium, which when executed on the at least one processor, causes the processor to:

receive, at a second device, individual privacy specifications from a plurality of first devices with each of the individual privacy specifications including a) a safe zone specifying disclosure granularity of device data and b) a precision parameter controlling disclosure of levels of granularity within the safe zone;

group, by the second device, the plurality of first devices, into multiple groups, wherein the plurality of first devices of a group share a node of a taxonomy according to the safe zone based on the individual privacy specifications, the taxonomy is selected based on a category of the device data of the first device to be collected by the second device;

send, to each of the multiple groups, guidance representing instructions to distort the device data by causing the device data to be transformed according to the node of the taxonomy that each of the plurality of first devices are grouped while preserving privacy as the second device is unable to infer the device data of the plurality of first devices;

receive, at the second device, the transformed device data of each of the plurality of first devices; and generate aggregated statistics for the plurality of first devices with a same safe zone.

19. The data protection system of claim 18, wherein each of the individual privacy specifications from the plurality of first devices corresponds to a selection within the taxonomy where the safe zone is a node within the taxonomy and the precision parameter limits a capability of a third party of distinguishing levels within the safe zone.

20. The data protection system of claim 18, wherein sending the guidance comprises sending information to each of the plurality of first devices to perform a randomization of the device data with a probability function that takes an input bit string and outputs a sanitized bit or bit string.

21. The data protection method of claim 4, wherein each group is partitioned into different clusters to minimize a maximum absolute error of the aggregated statistics.

* * * * *